July 26, 1938.   G. F. RYAN   2,124,676
METHOD OF MAKING CUTTING DIES
Original Filed Oct. 31, 1934   4 Sheets-Sheet 1
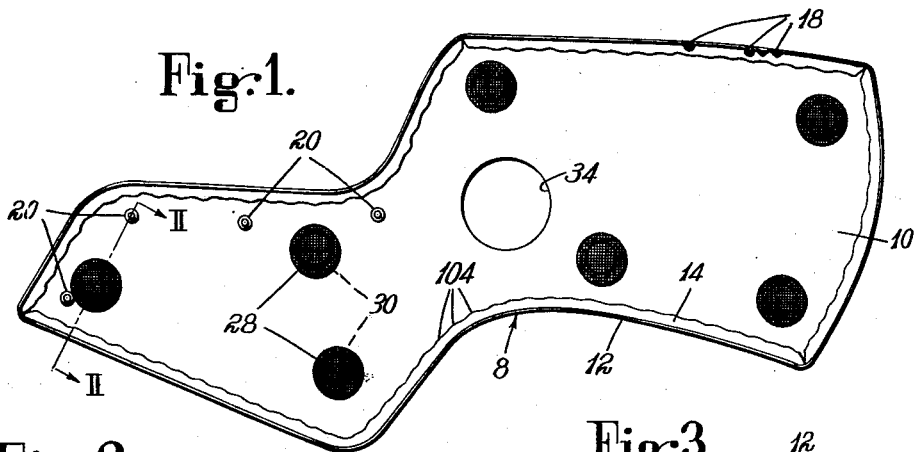
Fig. 1.
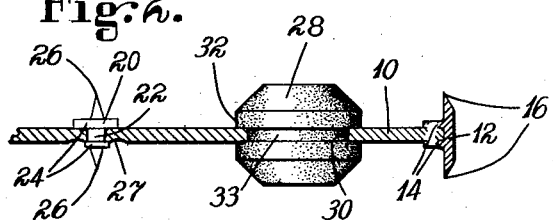
Fig. 2.
Fig. 3.
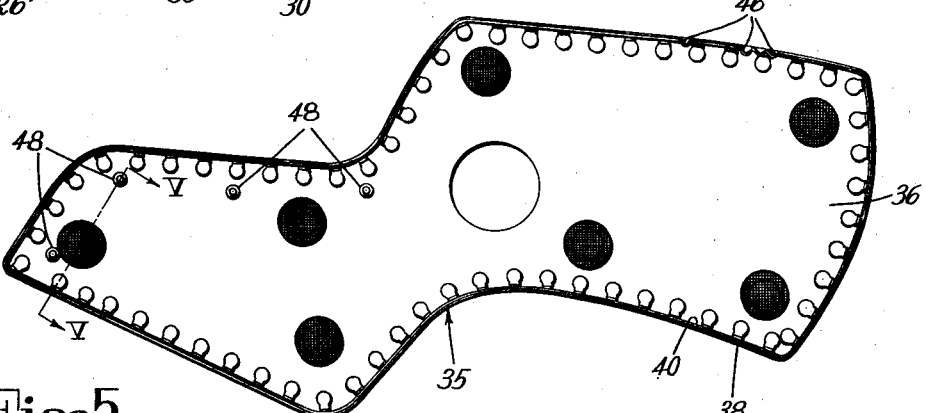
Fig. 4.
Fig. 5.
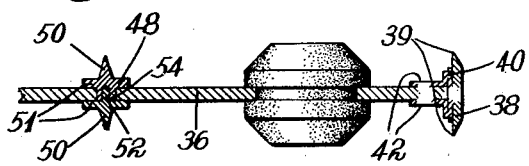
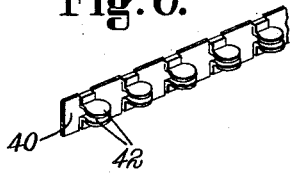
Fig. 6.
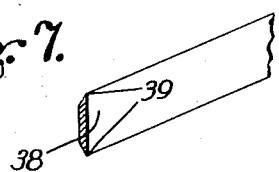
Fig. 7.
Inventor
George F. Ryan
By his attorney
Victor Cobb.

July 26, 1938.  G. F. RYAN  2,124,676
METHOD OF MAKING CUTTING DIES
Original Filed Oct. 31, 1934   4 Sheets-Sheet 2
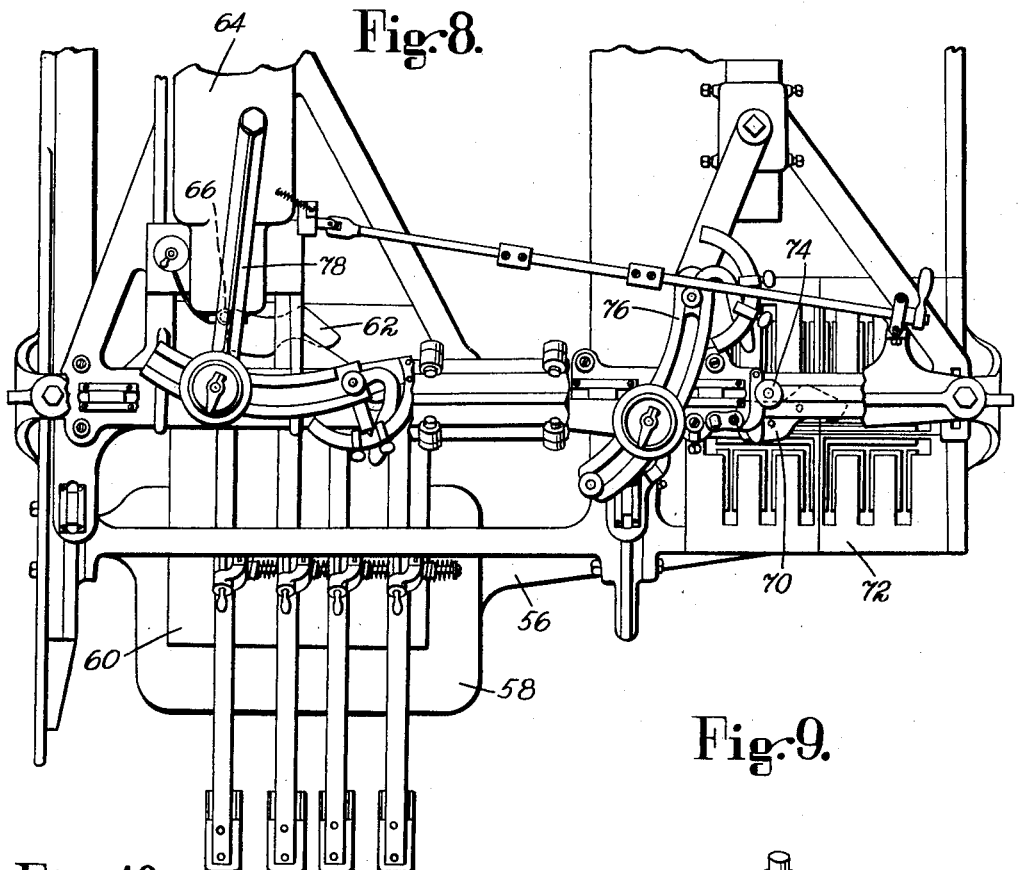
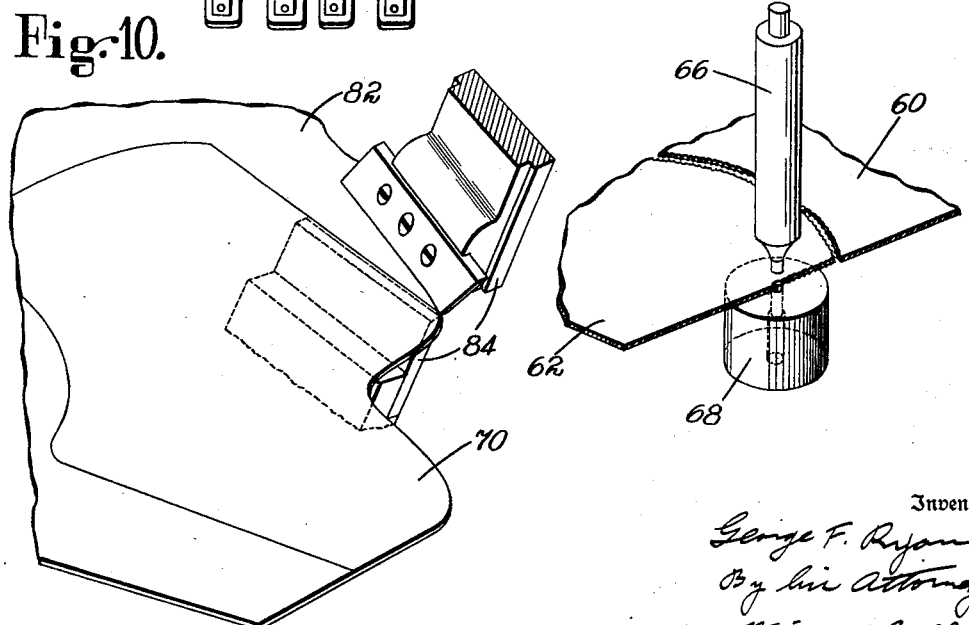
Inventor
George F. Ryan
By his Attorney
Victor Cobb.

July 26, 1938.  G. F. RYAN  2,124,676
METHOD OF MAKING CUTTING DIES
Original Filed Oct. 31, 1934  4 Sheets-Sheet 3

Inventor
George F. Ryan
By his attorney
Victor Colb

July 26, 1938.  G. F. RYAN  2,124,676
METHOD OF MAKING CUTTING DIES
Original Filed Oct. 31, 1934   4 Sheets-Sheet 4

Inventor
George F. Ryan
By his Attorney
Victor Cobb.

Patented July 26, 1938

2,124,676

UNITED STATES PATENT OFFICE 2,124,676

METHOD OF MAKING CUTTING DIES

George F. Ryan, Lynn, Mass., assignor to United Shoe Machinery Corporation, Paterson, N. J., a corporation of New Jersey Original application October 31, 1934, Serial No. 750,861. Divided and this application October 12, 1935, Serial No. 44,741

3 Claims. (Cl. 76—107)

This invention relates to methods of making dies and is herein illustrated in connection with the manufacture of dies for producing shoe part blanks from sheet material such as leather. The present application is a division of application Serial No. 750,861, filed October 31, 1934, in my name.

In the manufacture of shoes it has heretofore been customary to produce shoe parts, such as vamps or quarters which when assembled form the uppers of shoes, either by machine or by hand. In the machine operation it is ordinarily the practice to make use of a metal die which is forced through sheet material by means of a clicking machine or press, thereby to form a blank. In the hand operation it is customary to make use of a shoe part pattern which is used as a guide for a knife which is run around the periphery of the pattern to form a blank. The machine operation is employed in most shoe factories in instances where a run of shoes of a given style to be produced is reasonably large. Some shoe factories, however, heretofore have found it more economical to use the hand cutting operation thereby avoiding the greater initial cost of dies as compared with patterns. This has been true particularly, for example, in factories which make lines of shoes which are subject to frequent style changes or in which for any reason the run of shoes is likely to be small. The patterns customarily employed in carrying out the hand cutting operation, while costing less than corresponding dies for use in clicking machines, nevertheless involve a very substantial portion of the expense incurred in the cutting of parts which form the shoe upper.

In view of the foregoing, it is an object of the present invention to provide an improved method of manufacturing cutting dies which will effect such economies as to make it feasible to utilize dies in producing shoe parts even in such cases as those in which the run of shoes is small, thus further making it possible to eliminate to a large extent the employment of hand cutting methods. To this end, and as illustrated, the invention provides a method of making cutting dies which consists in providing a template corresponding to the shape of a blank such as a shoe part to be produced in various dimensions, utilizing the template as a model in cutting pantographically from sheet material a plurality of cores of different sizes and attaching cutting blades to the cores along the peripheries thereof to produce a graded series of cutting dies. The cores are preferably formed from light sheet metal which can be cut out by means of a pattern grading machine in substantially the same manner as it is now customary to cut out paper or fiberboard patterns. Preferably, the cutting blade is formed from a comparatively thin untempered metal strip which can be bent readily about the periphery of a core and permanently attached thereto by a welding process, after which the blade is tempered. In carrying out the above method it is to be noted that only one template or pattern is required in making a set of dies for producing a series of blanks such as shoe parts of similar shape but of various lengths and widths. The method is further advantageous in that the dies produced can readily be assembled with the result that the cost of making them is not disproportionately greater than the cost of producing patterns for hand cutting operations, thus making it feasible to utilize cutting dies in a comparatively rapid machine operation even though the number of shoe parts to be produced is small.

The invention in these and other aspects will be apparent from the following detailed description when taken in connection with the accompanying drawings and will be pointed out in the claims.

Fig. 1 is a plan view of one form of cutting die produced by carrying out the method of my invention;

Fig. 2 is a cross-section on an enlarged scale taken along lines II—II of a portion of the die illustrated in Fig. 1;

Fig. 3 is a perspective view of a portion of the cutting blade of the die of Fig. 1;

Fig. 4 is a plan view of a modified form of die which can be produced by the method of my invention;

Fig. 5 is a cross-section on an enlarged scale taken along the line V—V of Fig. 4;

Fig. 6 is a perspective view of an intermediate strip for securing the blade to the core of the die shown in Fig. 4;

Fig. 7 is a perspective view of a portion of the blade forming part of the die shown in Fig. 4;

Fig. 8 is a plan view of a portion of a pattern grading machine for grading cores in accordance with my invention;

Fig. 9 is a perspective view showing the operation of the punch in forming a core;

Fig. 10 is a perspective view illustrating the operation of shears in forming a template;

Figure 11:
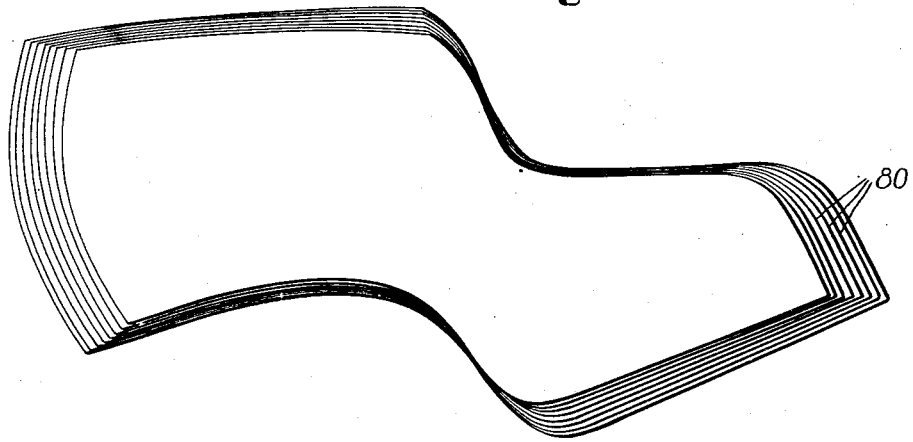
Fig. 11 is a plan view of a series of graded cores.

As shown in Fig. 1, one form of die 8 produced by my novel method comprises a sheet metal core 10 shaped to correspond in outline to that of a shoe part blank such as a quarter to be produced by the die, and having secured thereto a double-edged blade 12. The blade 12 is formed of a thin strip or ribbon of rolled or milled annealed steel stock which, as shown in Fig. 3, has flanges 14 projecting laterally from the central portions thereof and spaced apart by the thickness of the core 10. The stock is bent along the periphery of the core and permanently secured thereto with its body portion normal to the faces of the core by spot-welding the flanges to the faces, thus forming a rigid construction especially adapted to prevent distortion of the blade by forces acting laterally thereof. The edge portions of the blade are beveled to produce oppositely disposed cutting edges 16 which lie in parallel planes thus constituting cutting members shaped respectively to produce "left" and "right" blanks of corresponding outlines. This construction makes it possible to utilize a single die for cutting right and left blanks for a given shoe part, thereby reducing the cost of equipment, as well as contributing to efficiency in the cutting operation by reducing the number of dies to be handled.

To provide for the marking of sizes upon the cutting blanks the cutting blade 12 is nicked or crimped along its cutting edge as indicated by reference character 18.

The die is also provided with prick markers or stabs for the purpose of indicating the relation of certain portions of the blank to other parts of the shoe in which it is to be assembled. To this end, the die is provided with stabs 20, each of which comprises a frusto-conical shank 22 adapted to be inserted in a perforation in the core 10 and two flanges 24 adapted to engage opposite faces of the core and having projecting therefrom points or markers 26. Each stab is secured in position in the core by upsetting the material surrounding the shank to form a shoulder 27 which engages and holds the frusto-conical shank.

Means is provided for stripping cut blanks from the die. As illustrated in Figs. 1 and 2 this means comprises a plurality of stripping members in the form of rubber plugs 28 located in openings 30 in the core. The body portion 32 of each of the plugs 28 is substantially cylindrical and is slit midway of its ends as indicated at 33 so that when the plug is forced into an opening 30 the material of the core surrounding the opening enters the split portion 33 of the plug. This construction provides adequate means for supporting the plugs and maintaining them in position without the use of any additional parts and facilitates their assembly in the die. Each plug is so shaped that its end portions extend slightly beyond the planes of the cutting edges 16 on opposite sides of the core 10 with the result that in the operation of the die upon sheet material the end portions of the plugs are forced toward the core during the application of pressure but when the pressure is released the plugs will return to their normal shape, thus forcing out a cut blank from the interior of the die. During location of the die upon the work the plugs 28 support the cutting edges adjacent to the work above the same thus reducing likelihood of marring the surface of the work. Further to assist the operator in removing blanks from the die there is provided a circular opening 34 through which the operator may thrust a finger in grasping a blank. The opening 34 may also be used to facilitate picking up the die without touching the cutting edges.

In Figs. 4 and 5 there is illustrated a modified form of die 35 comprising a core 36, a cutting blade 38, extending along the periphery of the core and preferably welded to an intermediate strip 40 which is in turn welded to the core. The blade in this instance is preferably composed of annealed steel stock in the form of a thin ribbon as shown in Fig. 7, and having cutting edges 39. The intermediate strip 40 (Fig. 6) is preferably of thin sheet metal having lugs 42 formed integrally therewith and extending from opposite margins of the intermediate strip. These lugs are bent inwardly and are arranged to engage opposite faces of the core along the periphery thereof. By welding the blade 38 to the strip 40 and then welding the lugs 42 to the core 36 a rigid die construction is produced in that the cutting blade is rigidly and permanently secured to the core at frequent intervals along its periphery, the lugs serving to prevent distortion of the blade laterally and operating to maintain the blade in substantially perpendicular relation to the faces of the core.

The die is supplied with marking devices in the form of nicks 46 and with stabs 48. The stabs 48, which are somewhat different in construction from the stabs 20, comprise two conical members 50 having flanges 51 in engagement with opposite faces of the core 36. One of the flanges has a projection 52 adapted to be forced into a sleeve 54 in the other portion and positioned in an opening in the core, thus to secure the stabs in position in engagement with opposite faces of the core 36.

In order to facilitate the manufacture of dies of the type above described, for example, dies corresponding in construction to that of die 8 illustrated in Fig. 1, use is made of a pattern grading machine by which it is possible to produce cores for dies to be used in making all of the blanks of various lengths and widths for shoe parts to be used in making shoes of a given range of sizes. One type of the machine which is adapted for this purpose comprises a frame 56 (Fig. 8) having a table 58 upon which may be clamped a sheet of metal 60 from which cores such as core 62 are to be cut. The machine comprises a cutter head 64 carrying a reciprocating cutting tool or punch 66 (see Figs. 8 and 9) arranged to cooperate with a die 68 and mounted for movement pantographically with respect to a model or template 70 clamped to a fixed portion 72 of the frame, movement of the cutter head being controlled by means of a model tracing element 74 through linkages 76 and 78 whereby the relative size and shape of a core produced bears a predetermined relation to the size and shape of the template. For a more complete description of a machine which is adapted for this purpose reference may be had to United States Letters Patent No. 1,079,022, granted Nov.

18, 1913, upon an application filed in the name of C. E. Reed.

In making cores for dies for use in producing the necessary blanks for a range of sizes of shoes such as cores 80 (Fig. 11) it is only necessary for a shoe manufacturer to supply a paper pattern of model size, commonly size 4B. From this pattern is made a template such as template 70 (Fig. 10), for example, by outlining the paper pattern upon a sheet of metal 82, trimming to the marked outline, conveniently by means of shears such as shears 84, and then finishing the edges of the blank formed to correspond accurately to the outline of the paper pattern by filing them down to size. The template thus formed can then be used in a pattern grading machine of the type mentioned to produce from a sheet of metal 60 the required number of cores of each of the various sizes. This, of course, requires adjustment of the pantographic levers of the machine in a manner which is well understood in the art of pattern grading. In this way any required number of cores of a series of cores corresponding to blanks of different lengths and widths may be produced. Fig. 11 illustrates the relation between the cases of a series of cores for dies for producing quarter blanks of one style.

Figure 12:
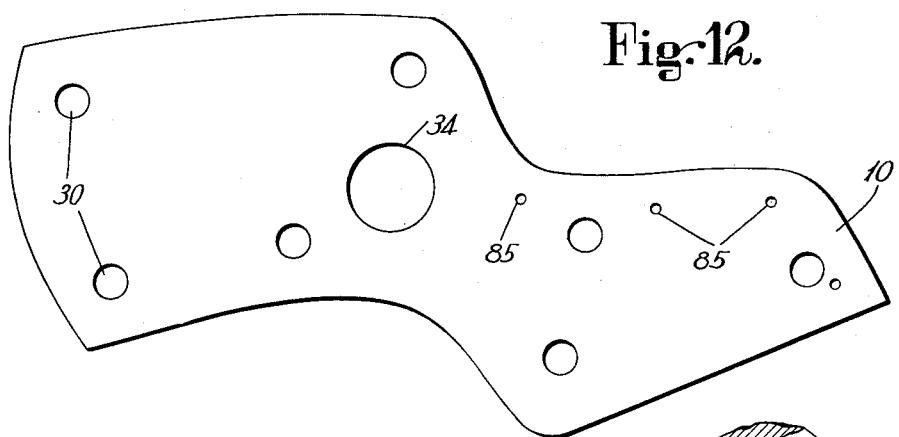
Fig. 12 is a plan view of a core after it has been drilled.

Assuming that a core or cores have been made, the steps for producing a die of the construction shown in Fig. 1 will now be set forth. The next operation performed upon a core such as core 10 (Fig. 12) comprises the drilling therein of holes 30 for the reception of the stripper plugs 28, openings 85 for the stabs 20 and the finger hole 34.

Figure 13:
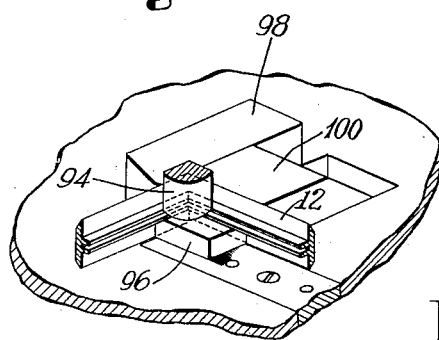
Fig. 13 illustrates a portion of a device for bending a cutting blade.
Figure 15:
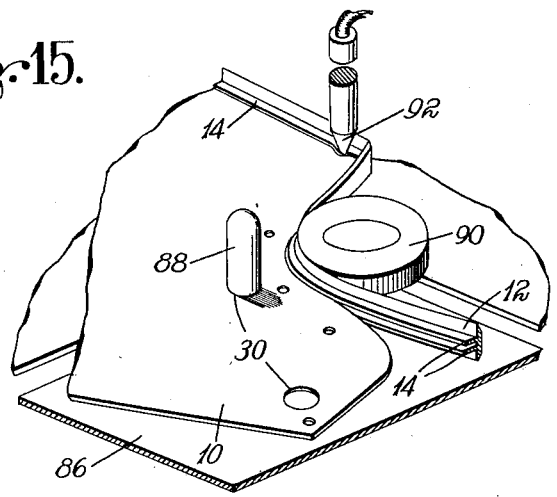
Fig. 15 is a perspective view of an apparatus for bending a blade about a core and temporarily securing the blade thereto.

The core is then ready to have a cutting blade attached thereto. This is preferably done by bending the blade 12 along the periphery of the core in such manner that the flanges 14 on the blade overlap opposite marginal edge portions of the core and molecularly uniting the material of the blade and core preferably by spot-welding the flanges to the core. This can be conveniently accomplished by apparatus such as that illustrated in Fig. 15 which comprises a table 86 provided with a stud 88 and a pivoted roller 90 which are movable along the table in directions at right angles to each other. A core such as the core 10 is placed upon the table with one of the stripper openings 30 engaged by the stud 88. A strip of soft steel stock which is to form the cutting blade 12, and which has flanged portions 14, is brought into engagement with the edge of the core with the flange portions extending over the faces of the core, after which the stud 88 is moved toward the roller 90 and at the same time the core is rotated about the stud, with the result that the blade is forced into close engagement with the edge of the core. During this operation the blade is properly positioned heightwise of the core under the guidance of the flanges 14. After a portion of the blade has been bent along the core a welding electrode 92 is brought into engagement with the upper flange 14, thus to weld the blade to the core. This operation is continued until the blade has been bent around the entire periphery of the core. At the corners, it is sometimes necessary to file away or otherwise remove part of the material of the flanges in order that the core may be bent sharply. In bending corners use is made of apparatus, as shown in Fig. 13, whereby the blade 12 is clamped by two members 94 and 96 against a third member 98 while a plate 100 is moved into a direction to force the free end of the blade into a position at an angle to the clamped portion of the blade. This bending operation can readily be performed while the blade is partially bent around the core and secured thereto at one or more points.

Figure 16:
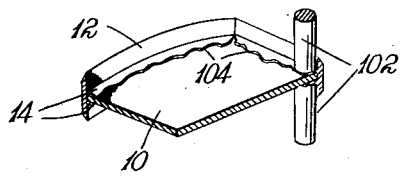
Fig. 16 illustrates the manner of permanently securing the blade to the core by welding.

After temporarily securing the blade to the core at several points along the periphery thereof and after severing ends of the blade stock so that they can come approximately together, a second welding operation is performed permanently to attach the flanges of the blade to the core. This is accomplished, as shown in Fig. 16, by apparatus including two electrodes 102, arranged to engage the flanges 14 upon opposite faces of the core and to weld the flanges to the core. This welding operation is repeated along the entire periphery of the core, preferably at points which, as indicated at 104, Figs. 1 and 16, are spaced about one-eighth of an inch apart, thus firmly to secure the blade to the core.

Figure 17:
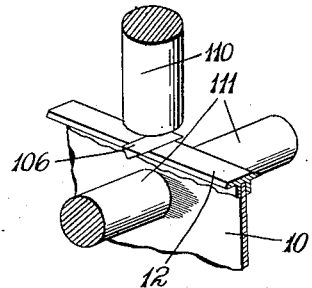
Fig. 17 illustrates the step of welding together the ends of a cutting blade.

In order to join the free ends of the blade so that the blade will be continuous about the entire periphery of the die it has been found expedient to weld the ends of the blade by the use of a separate piece of blade stock to fill the gap between the ends of the blade. To this end a piece of material in the shape of a triangular prism 106 (Fig. 17), is inserted in a V-shaped notch formed at the ends of the blade by a three-cornered file. The die is held in position by clamps 111 which engage opposite faces of the core 10 and a welding electrode 110 is brought into engagement with the material 106 to weld it in position. After this, the rough edges of the piece 106 are filed or ground down to conform to the shape of the adjacent portions of the blade 12, thus forming a cutting blade having continuous cutting edges.

Figure 14:
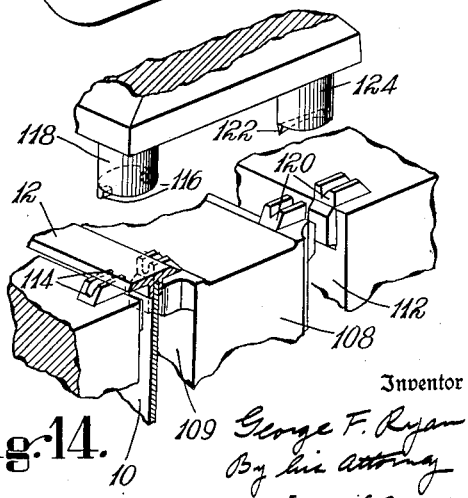
Fig. 14 illustrates a device for producing the size nicks in a cutting blade.

The size nicks 18 are then formed in the blade by apparatus such as that shown in Fig. 14, and which comprises a support 108 having slots 109 and 112 large enough to receive the core 10. Upon the support on opposite sides of the slot 109 are U-shaped anvil members 114 cooperable with projections 116 on a reciprocable tool 118 to produce U-shaped nicks in the edge portions of the blade 12. V-shaped nicks can be formed in the blade by anvil members 120 similarly arranged with relation to the slot 112 and which cooperate with a V-shaped projection 122 on a tool 124.

After the various operations above set forth have been completed the die is heated and quenched either in oil or air to harden the cutting edges, is sand blasted, painted, size markings are stamped thereon, and stabs and stripper plugs are inserted in the core thus completing the die.

The die 35 illustrated in Figs. 4 and 5 is formed by a method similar to that employed in producing the die 8 illustrated in Figs. 1 and 2 except that the strip 40 is usually first welded to the blade 38 and the blade and strip are then bent along the periphery of the core 36 after which the lugs 42 are spot-welded to opposite faces of the core. It is to be understood, however, that my invention also contemplates first welding the lugs to the core and then welding the blade to the strip as well as the alternate method of bending an unattached strip and blade along the core and simultaneously welding the blade to the strip and the lugs to the core.

In the use of the dies above described such a die is placed upon sheet material in a press with one of the cutting edges, for example, the lowermost cutting edge 16 of the die as shown in Fig. 2, slightly spaced from the material by the plugs 28. The presser member of the machine is then brought down upon the uppermost cutting edge to force the die through the material to produce a "left" blank, which is stripped from the die by the plugs 28 upon removal of the pressure. To produce a "right" blank the die is merely reversed and the operation repeated.

Having described my invention, what I claim as new and desire to secure by Letters Patent of the United States is:

1. The method of producing dies which consists in providing a template corresponding in shape and dimensions to one blank of a series of blanks of similar shape but of different sizes to be cut from sheet material, utilizing the template in cutting pantographically from sheet metal a series of cores corresponding to the series of blanks, and attaching cutting blades to the cores to form a graded series of cutting dies.

2. The method of producing dies which consists in forming a template corresponding in shape to a shoe part blank of model size, utilizing the template as a guide in cutting from sheet metal a plurality of cores corresponding pantographically to a series of shoe parts of various lengths and widths to be produced, and welding cutting blades along the peripheries of the cores to form a graded series of cutting dies.

3. The method of producing cutting dies which consists in cutting from sheet metal a core corresponding in outline to a blank to be produced, providing a blade having spaced laterally extending projections, bending the blade along the edges of the core while utilizing the projections as guides in locating the blade heightwise of the core, and welding the projections to the faces of the core.

GEORGE F. RYAN.